Nov. 8, 1927.

L. L. CHERRY 1,648,756

AUTOMATIC VALVE

Original Filed Aug. 21, 1923

Patented Nov. 8, 1927.

1,648,756

UNITED STATES PATENT OFFICE.

LUTHER L. CHERRY, OF CROMWELL, OKLAHOMA.

AUTOMATIC VALVE.

Application filed August 21, 1923, Serial No. 658,599. Renewed May 12, 1927.

The object of the invention is to provide a valve mechanism for use in connection with battery tanks used in oil fields, so that the flow of oil, after each tank is filled or its contents reach a prescribed level, will be cut off from that tank automatically to avoid the inconvenience and expense incident to relying upon the manual closing of the tank supply valves with the uncertainty thereto and the liability of permitting overflow and waste of oil. Further it is the object to provide a mechanism which, while particularly adapted for use in connection with battery tanks, may be utilized also in connection with supply tanks and like apparatus where the desire is to maintain the level of the contents of the tank or, in other words, to maintain the tank in a substantially full condition, the supply valve being under the control of mechanism to permit of opening and closing the supply according to withdrawals from the tank.

With these objects in view the invention consists in a certain illustrated construction and combination of parts which, however, in no sense defines the limits of the invention.

Figure 1:
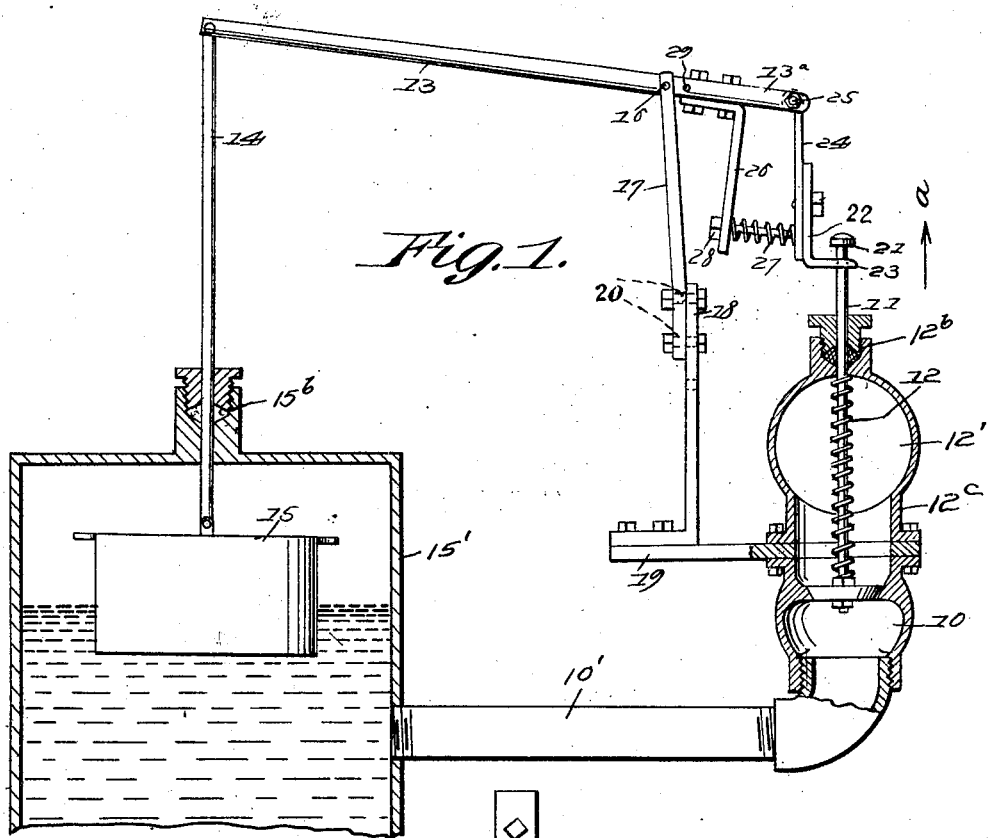
Figure 1 is a side view of an apparatus embodying the invention, portions of the structure being shown in section.
Figure 2:
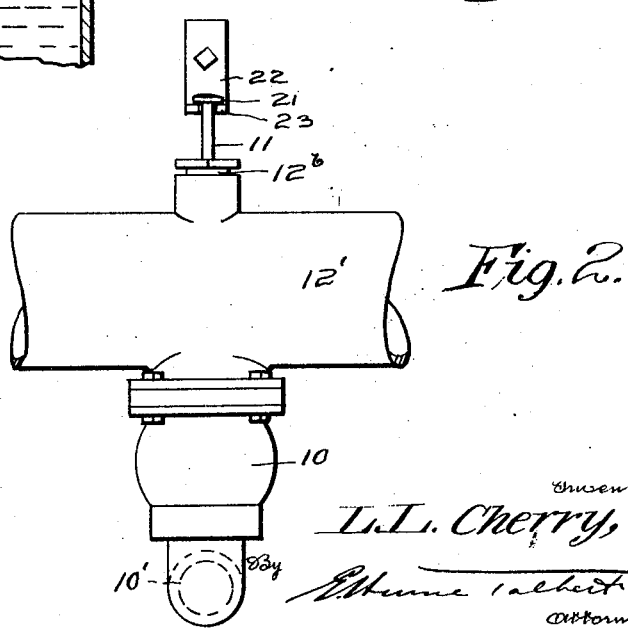
Figure 2 is a front elevational view of the valve structure and connected supply pipe therefor.

The apparatus embodying the invention contemplates the use of a valve 10 which may be a globe valve or of any other suitable or preferred commercial form, having a stem 11 provided with a spring 12 normally keeping the valve in closed position, and a float actuated lever 13 from which, by means of a suitable rod 14 is suspended a float 15 adapted to be controlled in its position by the level of the liquid contents of the tank 15′ in which the float is disposed, the tank being closed at its upper end and provided with a stuffing box 15ᵇ through which the rod 14 passes. Tanks, such as tanks 15′, are arranged in batteries from 6 to 10, each being equipped with a valve 10 and an operating mechanism therefor, and the oil or other contents being carried to the tanks through the pipes 10" connected respectively with the valves 10 and with the tanks 15′.

All the valves 10 in each battery are spanned by a feed pipe 12′ and the operating stems 11 of the valves extend diametrically through this pipe and pass through stuffing boxes 12ᵇ. Thus when the valves are in the open position the contents of the feed pipe may pass to the tanks respectively controlled by the valves and as each tank fills its particular float is raised with the resultant seating of the valve and the cutting off of the flow to that particular tank.

The lever 13 is provided with a fulcrum 16 which is adapted for adjustment in a path parallel with the direction of movement of the valve stem 11 and to accomplish this the construction includes, in the illustrated embodiment, a standard 17 forming a support for said fulcrum and adjustably mounted upon a suitable bracket 18 rising from a suitable base 19 disposed between the valve 10 and the tank 15′ and extended to provide a supporting portion interposed between the down leg 12ᶜ of the supply pipe and the valve 10. Thus the base is supported by the supply pipe jointly with the valve. The adjustment of the standard 17 to vary the position of the fulcrum 16 in its path of movement is accomplished by means of bolts 20 engaging suitable registerable openings in the standard and bracket.

The valve stem 11 is provided with a head or button 21 for engagement by a valve lifter 22 carried by the float actuated lever 13 at the opposite extremity from the float, the fulcrum 16 of said float lever being arranged very close to the valve lifter arm so that the arm 13ᵃ of the float lever which carries the valve lifter arm is very short in comparison with the float arm of the float lever. The valve lifter is forked or provided with a bifurcated terminal 23 to engage the valve stem and is suspended from the short arm of the float lever by means of a rocker arm 24 pivotally connected to the float lever at 25 so that unless otherwise impelled the valve lifter will follow a path parallel with the vave stem and will remain in engagement therewith during the opening and closing movements of the valve.

Also carried by the short arm of the float lever is an arm 26 extending from said lever on a line substantially parallel with the rocker arm and from a point closer to the fulcrum 16 of the lever than said rocker arm and terminally connected with the rocker arm on a line substantially parallel with the float lever, so that as the extremity of the valve lifter carrying arm of the float lever rises along the line indicated by the arrow $a$ in the drawings the tendency of the arm 26 is to push the valve lifter outwardly or away from the standard in the vertical plane of the fulcrum of the float lever and thus maintain the fork or bifurcation in engagement with the valve stem. The connection between the arm 26 and the rocker arm in the construction illustrated consists of an expansion spring 27 and a tensioning screw 28 permitting movement of the valve lifter toward the arm 26 in opposition to the expansive action of the spring while preventing a relative movement from the normal position of said lifter in the opposite direction.

Thus, as applied to battery tanks, in the handling of oil in the field, when the tank in connection with which the particular apparatus is associated is being emptied, the float is suspended and thereby, due to the engagement of the valve lifter with the valve stem, holds the valve in the open position in opposition to its closing spring 12. When, however, the inflow of oil has progressed until it has reached the predetermined level, the float is elevated and the valve lifter lowered and the closing of the valve by means of its actuating spring follows.

Having described the invention, what is claimed as new and useful is:—

1. A valve operating mechanism for use in connection with a terminally headed stem of a self-closing valve having a float actuated lever, said mechanism comprising a valve lifter extending laterally from and in the plane of movement of the said lever and provided with a fork for engaging the headed terminal of the valve stem, and means carried by the float lever for moving the valve lifter in a path transverse to the valve stem and consisting of an arm having a spring connection with the valve lifter.

2. A valve operating mechanism for use in connection with a terminally headed stem of a self-closing valve having a float actuated lever, said mechanism comprising a valve lifter pivotally mounted on and extending laterally from and in the plane of movement of the said lever and provided with a fork for engaging the headed terminal of the valve stem, and means, carried by the float lever for moving the valve lifter in a path transverse to the valve stem, the stem engaging end of the valve lifter being adjustable toward and from the valve lifter moving means to vary the extent of swinging movement thereof.

3. A valve operating mechanism for use in connection with a terminally headed stem of a self-closing valve having a float actuated lever, said mechanism comprising a valve lifter extending laterally from and in the plane of movement of the said lever and provided with a fork for engaging the headed terminal of the valve stem, and means carried by the float lever for moving the valve lifter in a path transverse to the valve stem, a rocker arm being carried by the float lever to support said valve lifter.

4. A valve operating mechanism for use in connection with a terminally headed stem of a self-closing valve having a float actuated lever, said mechanism comprising a valve lifter extending laterally from and in the plane of movement of the said lever and provided with a fork for engaging the headed terminal of the valve stem, and means carried by the float lever for moving the valve lifter in a path transverse to the valve stem, a rocker arm being pivotally mounted upon the float lever to carry said valve lifter and being yieldingly impelled by said means toward said valve stem.

5. A valve operating mechanism for use in connection with a terminally headed stem of a self-closing valve having a float actuated lever, said mechanism comprising a valve lifter extending laterally from and in the plane of movement of the said lever and provided with a fork for engaging the headed terminal of the valve stem, and means carried by the float lever for moving the valve lifter in a path transverse to the valve stem, a rocker arm being pivotally mounted upon the float lever to carry said valve lifter and being yieldingly impelled by said means toward said valve stem, and means for varying the position of the fulcrum of said lever.

In testimony whereof he affixes his signature.

LUTHER L. CHERRY.